UNITED STATES PATENT OFFICE.

CLAYTON W. BEDFORD AND WILLIAM J. KELLY, OF AKRON, OHIO, ASSIGNORS TO THE GOODYEAR TIRE & RUBBER COMPANY, OF AKRON, OHIO, A CORPORATION OF OHIO.

HALOGENATED RUBBER COMPOUND AND METHOD OF PREPARING THE SAME.

1,377,152. Specification of Letters Patent. Patented May 3, 1921.

No Drawing. Application filed September 18, 1919. Serial No. 324,637.

*To all whom it may concern:*

Be it known that we, CLAYTON W. BEDFORD and WILLIAM J. KELLY, citizens of the United States, and residents of Akron, Ohio, have invented new and useful Improvements in Halogenated Rubber Compounds and Methods of Preparing the Same, of which the following is a specification.

Our invention relates to the art of preparing a rubber compound containing a halogen and to the new and useful product obtained thereby.

The nature, objects and advantages of the invention, as well as the method of procedure will be fully understood from this specification, including the claims hereof, wherein the invention has been clearly defined.

Caoutchouc or any pure rubber is of a very plastic nature and this plasticity may be varied. If a halogen be caused to react with the rubber, the change in plasticity is in proportion to the amount of halogen which has reacted with the rubber. Furthermore it has been found that a halogenated rubber compound possesses certain desirable qualities, for example, increased toughness, and resistance to the action of gases or chemicals.

If caoutchouc be halogenated, for example, by treatment with chlorin, until no more chlorin reacts with the caoutchouc, the resulting product will be less plastic than the original rubber and many of its other characteristic properties materially affected. We have discovered, that if some of the so-called free or double bonds of the caoutchouc molecule be first satisfied by union with a vulcanizing agent, for example, sulfur, oxygen, and the like, which in themselves cannot be replaced by action of a halogen on the compound, fewer halogen atoms can then enter the molecule, yet the result will be a saturated compound containing halogen.

We are, of course, aware of the fact that rubber is commonly vulcanized or cured by the use of sulfur chlorid, and that the chlorin present in the product is present as chlorin of addition and not of substitution. Our method, however, relates to the production of a halogenated vulcanized rubber having the halogen present as an element of substitution, as well as an element of addition.

A particular advantage of our process lies in the fact that not only are we able to obtain a highly halogenated rubber compound containing sulfur or other vulcanizing agents, and one which is soluble in benzol, carbon-tetrachlorid, etc., but that we also are able to produce such a compound from scrap rubber, and consequently at much lower cost. Furthermore, we are able to produce our improved compound from rubber originally vulcanized by any of the usual vulcanizing agents, such as sulfur, sulfur chlorid or oxidizing agents and the like.

The method of obtaining this halogenated vulcanized rubber may start with plantation rubber, or with scrap vulcanized rubber, such as scrap pure gum inner tubes, the resulting compounds being in all cases basically the same, and for the sake of making the invention clear the following examples are given:

1. A known weight of plantation rubber, such as pale crape, or any other form of crude rubber, is dissolved in a solvent unaffected by chlorin; carbon tetrachlorid ($CCl_4$) having been found to be a suitable solvent for this purpose. To the solution is then added two per cent. (2%) of sulfur, (referred to the original weight of rubber used.)

Chlorin gas is then passed into the solution until no more gas is absorbed.

The chlorinated vulcanized product may be used in solution, or the solvent may be evaporated, or the chlorinated product may be precipitated with alcohol, or the like.

2. To a solution of crude rubber, prepared as in example 1, sulfur chlorid may be added, instead of forming it in the solution and the reaction may, if necessary, be completed by the reaction of chlorin. This method likewise produces a chlorinated vulcanized rubber.

3. Plantation rubber may be dissolved in carbon-tetrachlorid, and carbon bisulfid added to the solution. Chlorin gas is then passed into the solution until the chlorination is complete. The necessary amount of carbon bisulfid would be determined by the amount of sulfur desired in the final product.

The following methods contemplate starting with scrap vulcanized rubber, and include broadly two steps, namely:

A. Removal of free vulcanizing agents,

B. Halogenation of the rubber thus obtained.

We have discovered that an intermediate step may, in some cases, be introduced, with advantageous results, between steps A and B, outlined above, and this consists in plasticizing the purified rubber, freed from excess vulcanizing agents, to render it quickly and readily soluble in a rubber solvent, such as carbon-tetrachlorid and the third step would then be the halogenation of this soluble reclaimed rubber while in solution.

In order to most successfully practice our method, it is desirable to reduce the amount of free sulfur or other vulcanizing agents,— such as those from a rubber vulcanized with oxygen, produced, for example, by the use of litharge and nitro-benzol—which may be present, otherwise they might interfere with the reaction of the halogen. The word "desulfurizing" has been used in this specification as referring to the reduction of the amount of free sulfur.

The following additional examples will indicate a procedure that may advantageously be followed in practising the method of producing halogenated vulcanized rubber from scrap rubber:

4. Vulcanized pure gum scrap rubber, preferably finely ground, is extracted with acetone, or boiled with caustic to remove the free sulfur.

In case caustic be used, the product is washed substantially free of alkali, any residual caustic being neutralized.

The material thus purified, is suspended in carbon-tetrachlorid, or other suitable liquid in which the final product will be soluble, and which will be unaffected by chlorin, and chlorin gas is then passed into the liquid. When the chlorination is effected, the product will dissolve in the solvent.

5. The sulfur or other free vulcanizing agent may be removed as described in example 4, and the product washed.

The product thus obtained is slowly added to about twice its weight of pine oil, or anilin, or nitro-benzol, or acetylene-tetrachlorid or other high boiling organic solvent and heated to 150–170 degrees C. The mix is maintained at that temperature, while being stirred, until a perfectly homogeneous solution is obtained, which may require several hours. After cooling, the solution is diluted with an approximately equal volume of some low boiling solvent, such as benzol and the rubber is then precipitated by the use of a precipitant such as alcohol or acetone. The precipitated rubber may be further purified by redissolving and reprecipitating until the pine oil, or other high boiling solvent, has been practically entirely removed. The resulting product is reclaimed rubber, containing no free vulcanizing agent—but which may, of course, contain sulfur of vulcanization, depending on the original curing method—and of soluble in practically any of the usual rubber solvents. This reclaimed rubber is dissolved in carbon-tetrachlorid or other solvent not affected by chlorin. Chlorin is then passed into the solution until no more is absorbed.

6. Reclaimed rubbers which contain mineral ingredients, such as zinc oxid or the like, may be treated as in example 5, except that the mineral fillers may be separated from the solubilized rubber before halogenation, by sedimentation, filtration, or centrifuging.

7. Instead of using high boiling solvents, such as those mentioned in example 5, for solubilizing the reclaimed rubber, this rubber may be placed in an autoclave with carbon-tetrachlorid or other low boiling solvents and brought into solution by heating under pressure. If carbon-tetrachlorid be used, the necessity of precipitating and redissolving the rubber is avoided, and the solution may be chlorinated directly after removal of compounding ingredients, if any be present.

In each of the examples given, it will be understood that the chlorinated vulcanized rubber may be used in solution, or the solvent evaporated, or the product precipitated by use of alcohol, or the like, as stated under example 1.

It is to be noted that the steps of our method may be effected in other ways than those described. Furthermore, other solvents or reagents than those specified may be used.

While we have described, in more or less detail, the specific steps of our method and named particular substances, solvents, chemicals, or other reagents used in practising the method, it will be understood that the claims hereto appended define the invention and we do not mean to be limited except by them. Nor is our invention to be regarded as dependent on the soundness or accuracy of any theories herein expressed.

Hence, changes and modifications in methods of procedure and materials used, such as fall within the scope of the claims, may be made, without in any sense departing from the essence of our invention.

What we claim is:

1. A rubber compound, the molecular structure of which includes more than two halogen atoms and an atom of a vulcanizing agent.

2. A rubber compound, the molecular structure of which includes more than two chlorin atoms and an atom of a vulcanizing agent.

3. A rubber compound, the molecular structure of which includes more than two halogen atoms and an atom of sulfur.

4. A rubber compound, the molecular structure of which includes more than two chlorin atoms and an atom of sulfur.

5. A halogenated vulcanized rubber composition to which the halogen has been added after vulcanization.

6. A chlorinated vulcanized rubber composition to which the chlorin has been added after vulcanization.

7. A halogenated vulcanized rubber containing both halogen of addition and halogen of substitution.

8. A chlorinated vulcanized rubber containing chlorin of addition and chlorin of substitution.

9. A halogenated vulcanized rubber produced by the halogenation of reclaimed rubber.

10. A chlorinated vulcanized rubber produced by the chlorination of reclaimed rubber.

11. The method of producing a halogenated vulcanized rubber compound which consists in dissolving the rubber, vulcanizing the rubber in solution by the use of the required definite amount of vulcanizing ingredient, whereby no excess of the vulcanizing ingredient remains, and halogenating the same solution.

12. The method of producing a chlorinated vulcanized rubber compound which consists in dissolving the rubber, vulcanizing the rubber in solution by the use of the required definite amount of vulcanizing ingredient, whereby no excess of the vulcanizing ingredient remains, and chlorinating the same.

13. The method of producing a halogenated vulcanized rubber compound which consists in reducing the amount of free vulcanizing agents in vulcanized rubber, and halogenating the material thus treated.

14. The method of producing a chlorinated vulcanized rubber compound which consists in reducing the amount of free vulcanizing agents in vulcanized rubber, and chlorinating the material thus treated.

15. The method of producing a halogenated vulcanized rubber compound which consists in desulfurizing vulcanized rubber, and halogenating the desulfurized rubber.

16. The method of producing a chlorinated vulcanized rubber compound which consists in desulfurizing vulcanized rubber, and chlorinating the desulfurized rubber.

17. The method of producing a halogenated vulcanized rubber compound which consists in reducing the amount of free vulcanizing agents in vulcanized rubber, mixing the material thus treated with a solvent and halogenating the material in the presence of the solvent.

18. The method of producing a chlorinated vulcanized rubber compound which consists in reducing the amount of free vulcanizing agents in vulcanized rubber, mixing the material thus treated with a solvent and chlorinating the material in the presence of the solvent.

19. The method of producing a halogenated vulcanized rubber compound which consists in reducing the amount of free vulcanizing agents in vulcanized rubber, mixing the material thus treated with a solvent unaffected by a halogen, and halogenating the material in the presence of the solvent.

20. The method of producing a chlorinated vulcanized rubber compound which consists in reducing the amount of free vulcanizing agents in vulcanized rubber, mixing the material thus treated with a solvent unaffected by chlorin, and chlorinating the material in the presence of the solvent.

21. The method of producing a halogenated vulcanized rubber compound which consists in desulfurizing vulcanized rubber, mixing the desulfurized rubber with a solvent and halogenating the material in the presence of the solvent.

22. The method of producing a chlorinated vulcanized rubber compound which consists in desulfurizing vulcanized rubber, mixing the desulfurized rubber with a solvent and chlorinating the material in the presence of the solvent.

23. The method of producing a halogenated vulcanized rubber compound which consists in desulfurizing vulcanized rubber, mixing the desulfurized rubber with a solvent unaffected by a halogen, and halogenating the material in the presence of the solvent.

24. The method of producing a chlorinated vulcanized rubber compound which consists in desulfurizing vulcanized rubber, mixing the desulfurized rubber with a solvent unaffected by chlorin, and chlorinating the material in the presence of the solvent.

25. The method of producing a halogenated vulcanized rubber compound which consists in reducing the amount of free vulcanizing agents in vulcanized rubber, suspending the material thus treated in a solvent, and passing a halogen into the suspension.

26. The method of producing a chlorinated vulcanized rubber compound which consists in reducing the amount of free vulcanizing agents in vulcanized rubber, suspending the material thus treated in a solvent, and passing chlorin into the suspension.

27. The method of producing a halogenated vulcanized rubber compound which consists in reducing the amount of free vulcanizing agents in vulcanized rubber, rendering the material soluble, separating the solubilized reclaim, dissolving the separated material, and then halogenating the same.

28. The method of producing a chlorinated vulcanized rubber compound which consists in reducing the amount of free vulcanizing agents in vulcanized rubber, rendering the material soluble, separating the solubilized reclaim, dissolving the separated material, and then chlorinating the same.

29. The method of producing a halogenated vulcanized rubber compound which consists in desulfurizing vulcanized rubber, solubilizing the desulfurized rubber by treatment with a solvent, dissolving the solubilized material, and halogenating the solution.

30. The method of producing a chlorinated vulcanized rubber compound which consists in desulfurizing vulcanized rubber, solubilizing the desulfurized rubber by treatment with a high boiling solvent, precipitating the solubilized reclaim, dissolving the precipitate in a solvent unaffected by chlorin, and chlorinating the solution.

31. The method of producing a halogenated vulcanized rubber compound which consists in reducing the amount of free vulcanizing agents in vulcanized rubber, solubilizing the material thus treated by treatment with a high boiling solvent, precipitating the solubilized reclaim, dissolving the precipitate in a solvent unaffected by a halogen, and halogenating the solution.

32. The method of producing a chlorinated vulcanized rubber compound which consists in reducing the amount of free vulcanizing agents in vulcanized rubber, solubilizing the material thus treated by treatment with a high boiling solvent, precipitating the solubilized reclaim, dissolving the precipitate in a solvent unaffected by chlorin, and chlorinating the solution.

33. The method of treating vulcanized scrap rubber which consists in boiling scrap rubber with caustic, washing the water to remove caustic, suspending the purified material in carbon-tetrachlorid, passing chlorin into the suspension, and recovering the product.

34. The method of treating vulcanized scrap rubber which consists in boiling scrap rubber with caustic, washing with water to remove caustic, solubilizing the purified material by heating with a high boiling solvent, dissolving the solubilized mass, precipitating the rubber, dissolving the precipitate in carbon-tetrachlorid, passing chlorin into the solution, and recovering the product.

35. The method of treating vulcanized scrap rubber which consists in devulcanizing scrap rubber, solubilizing the devulcanized rubber, dissolving the solubilized rubber, and halogenating the product.

In witness whereof we have hereunto signed our names in the presence of two subscribing witnesses.

CLAYTON W. BEDFORD.
WILLIAM J. KELLY.

Witnesses:
J. E. KEATING,
E. C. LEADENHAM.